June 23, 1964   J. HEIDENHAIN   3,138,714
APPARATUS FOR THE DETERMINATION OF THE
RELATIVE POSITION OF TWO PARTS
Filed May 23, 1962   2 Sheets-Sheet 1

INVENTOR
JOHANNES HEIDENHAIN
BY
ATTORNEY.

June 23, 1964  J. HEIDENHAIN  3,138,714
APPARATUS FOR THE DETERMINATION OF THE
RELATIVE POSITION OF TWO PARTS
Filed May 23, 1962  2 Sheets-Sheet 2

INVENTOR
JOHANNES HEIDENHAIN
BY
ATTORNEY.

United States Patent Office 3,138,714
Patented June 23, 1964

3,138,714
APPARATUS FOR THE DETERMINATION OF THE RELATIVE POSITION OF TWO PARTS
Johannes Heidenhain, Egerer, near Chieming, Germany, assignor to Firma Wenczler & Heidenhain, Traunreut, Upper Bavaria, near Traunstein, Germany, a corporation of Germany
Filed May 23, 1962, Ser. No. 197,086
Claims priority, application Germany May 27, 1961
3 Claims. (Cl. 250—237)

The present invention relates to an apparatus for the determination of the relative position of two parts, wherein one of the parts is mechanically guided relative to the other part in such manner, that it has a degree of freedom of movement. Such parts are, for instance, the immovable bed and the either rotatable or longitudinally adjustable table of a machine tool.

It is conventional, thereby, to secure an optical or optical-electrical sensing device to one of these parts, which sensing device cooperates with a grating provided on the other part. The sensing device comprises thereby always a construction unit disposed directly in front of the grating, the relative position of the construction unit measured in the direction of the mentioned degree of freedom of movement to the grating is decisive for the selection of the train of rays impinging from the grating upon a reading index and a photo-electric construction element, respectively.

It is of course desirable, to render measurable always smaller adjustment strokes, between the two parts movable relative to each other. The always more refined improvement of the grating and of the sensing device found, however, its limit there, where the distance deviations between the grating and the sensing device caused by the not entirely avoidable inaccuratenesses of the mechanical guidance between the adjustable parts mostly do not influence the wrong result directly, but the safety of the sensing.

If, for instance, an extremely strongly amplifying objective is used for the optical image of the grating on a reading index, due to the low depth definition of such objective, already small distance deviations between such objective and the grating bring about appreciable non-sharpness occurrences of the image, so that the sensing cannot be performed any more with the safety commensurate with the enlargement of the image. A similar situation prevails in such optically-electrically operating devices, in which, for instance, a grid-like divided line plate senses a grid-like divided grating, the grid constants of which are of the order of optical deflection grids, in order to bring about a possibly higher sensing exactness. In this case, undesirable deflection-optical appearances can interfere with the safety of the reading result in case of distance deviations between the grating and the sensing line plate.

It is, therefore, one object of the present invention to provide an apparatus for the determination of the relative position of two parts, wherein the drawbacks of the known structures are avoided.

It is another object of the present invention to provide an apparatus for the determination of the relative position of two parts, wherein one of the parts is guided relative to the other of the parts in such manner, that one of the parts has a degree of freedom of movement, namely of translation or rotation, by means of an optical or optical-electrical sensing device, which cooperates with a sensing device secured to the other part, and wherein at least the construction unit of the sensing device, whch is disposed immediately in front of the grating, is secured in such manner that the mentioned construction unit secured to the construction part is set relative to the part carrying the sensing device in the direction of the mentioned degree of freedom, which is, however, simultaneously, resiliently movable in a direction perpendicular to the grating plane and is maintained within a defined distance from the grating plane by means of distancing holders sliding on the grating plane, the relative position of the construction unit of the sensing device to the grating measured in direction to the mentioned degree of freedom being determinative for the selection of ray bundles impinging from the grating upon a reading index and a photo-electric construction element, respectively.

With these and other objects in view, which will become apparent in the following detailed description, the present invention will be clearly understood in connection with the accompanying drawings, in which.

Figure 1:
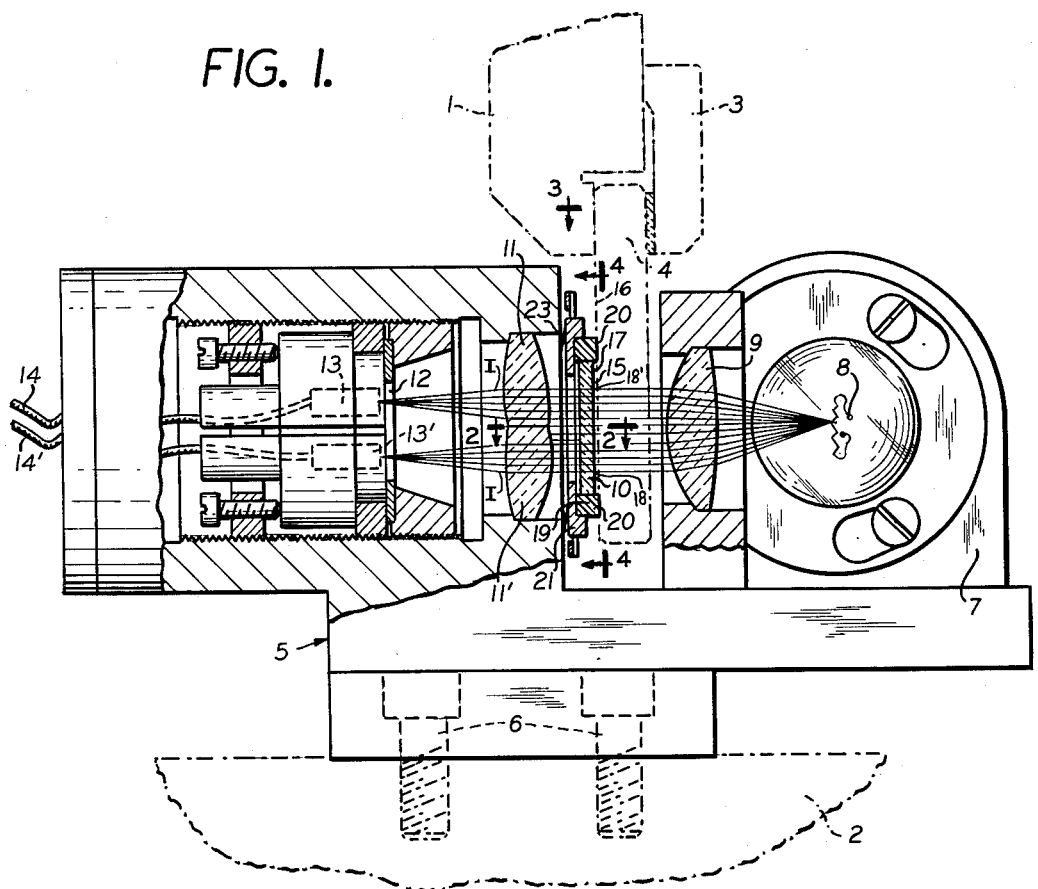
FIGURE 1 is an elevation of the device designed in accordance with the present invention, partly in section.

Referring now to the drawings, a table 1 of a machine tool is guided relative to its immovable bed 2 by guiding means (not shown) in such manner that the table 1 still has a degree of freedom of movement. The direction of movement extends perpendicularly to the plane of the drawing, whereby, however, due to unavoidable inaccuracies of the guiding elements, the movement is not exactly linear. By means of the conventional locking pieces 3 a grating 4 made of glass is secured to the table 1, which grating 4 thus performs the same movement as the table 1.

An optic-electric sensing device 5 is rigidly secured to the bed 2 by means of screw bolts 6. The device 5 comprises a lamp holder 7 including a lamp 8, a condenser 9, a sensing line plate 10, the securing of which on the sensing device 5 is explained below, two objectives 11 and 11' engaging each other, a slotted diaphragm 12 and two photo-electronic elements 13 and 13', which translate the light beams impinging thereon into electrical signals, which are transmitted by means of conduits 14 and 14' to a discriminating device (not shown).

Figure 5:
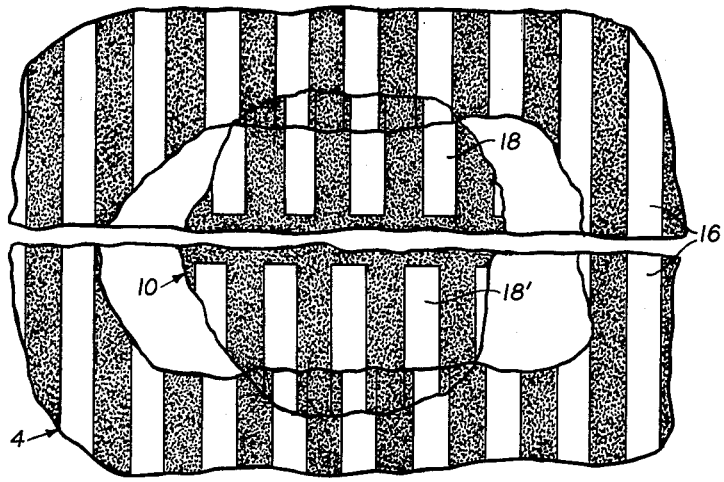
FIG. 5 is a greatly enlarged section of the used grating and sensing line plate in the relative spacial positions of the latter.
Figure 6:
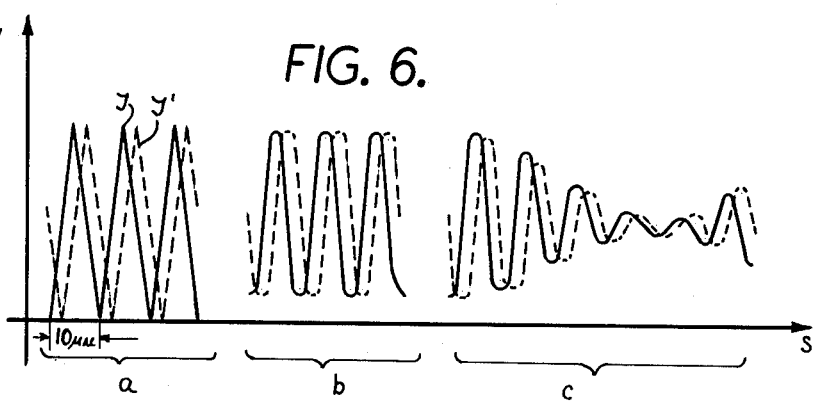
FIG. 6 depicts diagrams indicating the operation of the grid-sensing disclosed in FIG. 5.

The grating 4 has within its plane 15 a grid-like division 16, which is shown on an enlarged scale in FIG. 5. Likewise the sensing line plate 10 has on its face 17, disposed opposite the plane 15, two gratings 18 and 18', the phases of which are set off for an angle of 90°. For the shown example, it is to be assumed that the spacing between the grating 4 and the gratings 18 and 18' amounts to 10 $\mu$m. The light beams I and I', respectively, which penetrate, upon overlapping of the gratings 16 and 18 and 18', respectively, with completely parallel light beams and neglect of deflection-optical effects, are shown in FIG. 6a in dependency upon the relative displacement $s$ between the line plate 10 and the grating 4. The electrical signals responsive to the light beams I and I' are translated by means of the connected discrimination device of any conventional structure into length definitions, which translation means are however, not the subject matter of the present invention, and for this reason do not require further explanation.

The slotted diaphragm 12, the length of dimension of which extends in a plane parallel to the drawing of FIG. 1 and which is disposed in the focus of the objectives 11 and 11', is adapted for the purpose to lead only those light rays to the photo-electronic elements 13 and 13', which impinge upon the grating 4 and the line plate 10 in a plane parallel to the plane of the drawing of FIG. 1. Nevertheless, practically never curves depicting the light train, as shown in FIG. 6a, can be obtained, rather at its best, only those shown in FIG. 6b. Yet, even the dependency of the light beams impinging upon the photoelectric construction elements upon the displacement s, as shown in FIG. 6b, can be achieved only, if the distance between the planes 15 and 17 carrying the gratings amounts to just a few μm., for instance 5 μm., and which maintains steadily exactly this value. An immediate or direct engagement of the two faces 15 and 17 cannot be considered, due to the danger of scratches on the grating brought about by such arrangement. If even slight distance changes occur upon relative displacement s between the line plate 10 and the grating 4, a light beam curve results as shown in FIG. 6c, which permits clearly recognition, that a safe discrimination is no more possible.

In order to maintain the line plate 10 at the predetermined distance from the grating 4, whereby, however, simultaneously a completely constant position of the line plate 10 relative to the sensing device 5 in the direction of movement of the table 1 is to be maintained, the line plate 10 is fastened with putty or the like to a rectangular frame 19 of polyfluorine-ethylene, the longitudinal edges 20 of which overlap the grating plane 17 of the line plate 10 by the provided distance of very few μm. and serve as slide rails for engagement with the grating plane 15. The material, namely polyfluorine-ethylene, provided for the frame 19 is characterized by a particularly low friction coefficient, even without applying lubricating means, so that no layers which falsify the distance between the faces 17 and 15, have to be applied to the slide rails 20 and, nevertheless, an easily moving and wear-free displacement between the parts is possible.

The frame 19 in turn is inserted, for instance, by means of putty, into a metal frame 21, which is retained by two spring blade arms 22 extending parallel to the grating plane 15, which spring blade arms 22 are connected with the sensing device 5, however, do not exert a considerable force upon the frame 21 in a direction disposed perpendicular to the plane of the grating plane 15. Particular pressure springs 23, supported by the sensing device 5, provide a completely satisfactory engagement of the slide rails 20 on the grating plane 15. By the spring arms 22 directed nearly parallel to the grating plane 15, it is assured that, upon movements of the line plate 10 perpendicular to the grating plane 15, the relative position between the line plate 10 and the sensing device 5 cannot be changed for appreciable amounts in the direction of movement of the table 1.

Figure 2:
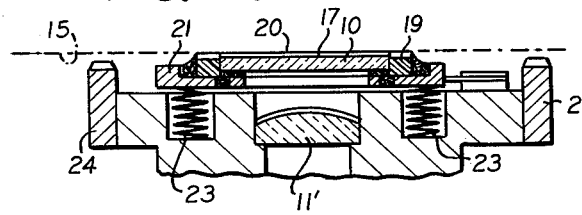
FIG. 2 is a section along the lines 2—2 of FIG. 1.
Figure 3:
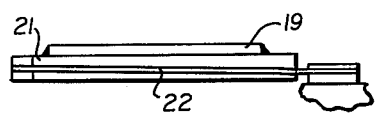
FIG. 3 is a fragmentary top plan view looking in the direction 3 of FIG. 1.
Figure 4:
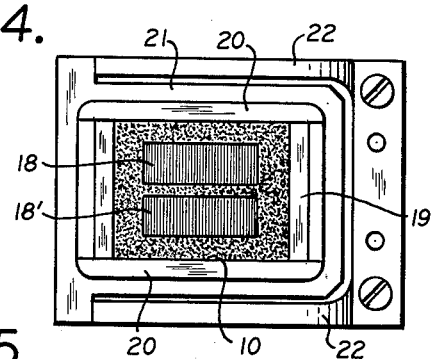
FIG. 4 is a fragmentary view taken along the lines 4—4 of FIG. 1.

The projections 24, shown in FIG. 2, on the sensing device 5 serve the purpose of assisting the adjustment for the arrangement of the grating 4 during the mounting of the entire device, and have no more function upon completely mounting and they remain rather at a safe distance of about 1/10 mm. from the grating face 15.

While I have disclosed one embodiment of the present invention, it is to be understood that this embodiment is given by way of example only and not in a limiting sense, the scope of the present invention being determined by the objects and the claims.

I claim:
1. An apparatus for the determination of the relative position of two parts comprising
   means for guiding the movement of one of said parts relative to the other of said parts,
   two superimposed optical gratings,
   one of said gratings being secured to said one of said parts and the other of said gratings being secured to the other of said parts,
   photo-electric sensing means including means for projecting a train of light rays through both of said gratings
   frame means for supporting one of said gratings and spring blade arms disposed in a plane parallel to said gratings retaining said frame means at one of said parts, and
   pressure springs engaging said one of said parts of said frame means to urge the latter toward the other of said gratings.
2. The apparatus, as set forth in claim 1, wherein
   said frame means comprises a frame receiving said one of said gratings and including a sliding edge projecting from said frame toward the other of said gratings so that said gratings are spaced apart from each other at a predetermined small distance.
3. The apparatus, as set forth in claim 2, wherein
   said sliding edge of said frame is made of polyfluorine-ethylene, in order to provide low friction and freedom of wear for said sliding edge.

References Cited in the file of this patent
UNITED STATES PATENTS

| | | |
|---|---|---|
| 2,720,810 | Senn | Oct. 18, 1955 |
| 2,886,717 | Williamson et al. | May. 12, 1959 |
| 3,011,379 | Corwin | Dec. 5, 1961 |
| 3,028,782 | Bernhardt et al. | Apr. 10, 1962 |
| 3,040,180 | Healy | June 19, 1962 |